United States Patent [19]

Nolan et al.

[11] Patent Number: 5,009,140

[45] Date of Patent: Apr. 23, 1991

[54] CLAMPING APPARATUS FOR CUT-OFF DIE SET

[75] Inventors: John H. Nolan, Mt. Clemens; Dennis H. Skvarce, Wixom, both of Mich.

[73] Assignee: Alpha Industries, Inc., Novi, Mich.

[21] Appl. No.: 449,594

[22] Filed: Dec. 12, 1989

Related U.S. Application Data

[63] Continuation-in-part of Ser. No. 417,033, Oct. 14, 1989, abandoned.

[51] Int. Cl.⁵ .......................... B26D 1/60; B23D 21/00
[52] U.S. Cl. .......................................... 83/698; 83/54; 83/300; 83/319; 83/310; 269/235; 269/231
[58] Field of Search ................ 83/698, 699, 300, 310, 83/318, 319; 269/66, 231, 235, 217, 305, 233

[56] References Cited

U.S. PATENT DOCUMENTS

| | | | |
|---|---|---|---|
| 1,008,115 | 11/1911 | Clark | 269/235 |
| 3,473,420 | 10/1969 | Boggs | 269/235 |
| 3,982,458 | 9/1976 | Terasaka | 83/685 |
| 4,086,837 | 5/1978 | Dyck | 83/699 |
| 4,294,147 | 10/1981 | Borzym | 83/389 |
| 4,477,064 | 10/1984 | DiGiulio | 269/231 |
| 4,602,497 | 7/1986 | Wallis | 269/235 |

Primary Examiner—Hien H. Phan
Assistant Examiner—Scott A. Smith
Attorney, Agent, or Firm—Krass & Young

[57] ABSTRACT

A clamping apparatus allowing an operator to securely position and clamp a cut-off die set to the carriage of a cut-off press. The clamping arrangement includes outwardly beveled sides on the die set coacting with an inwardly beveled stop and an inwardly beveled eccentric clamping member. The clamping member being rotatable to allow the die set to be placed in the proper position on the carriage. After positioning the die set on the carriage, the eccentric clamping members are rotated to contact the outwardly beveled edge of the platen thereby wedging the platen between the stop and the eccentric clamping members.

15 Claims, 4 Drawing Sheets

CLAMPING APPARATUS FOR CUT-OFF DIE SET

RELATED APPLICATION

This application is a continuation-in-part of U.S. Ser. No. 417,033, filed Oct. 14, 1989, abandoned.

INTRODUCTION

This invention generally relates to a tube cutting apparatus of the type employed to sever sections of tubing or similar stock emanating from a fabrication mill. More specifically, the present invention is directed toward an apparatus for quickly installing and securing a cut-off die set to the carriage of a press within which the die set operates.

BACKGROUND OF THE INVENTION

Cut-off systems typically comprise a clamping and shearing assembly called a cut-off die set. Cut-off die sets are well known, see for example U.S. Pat. Nos. 4,108,029; 4,109,555; 4,294,147 and 4,766,792. The die set often comprises upper and lower platens interconnected by a combination of guide bushings and pins enabling he platens to act with reciprocal motion. Typically, a vertical shearing blade is mounted to the upper platen and during the cutting stroke the motion of the upper platen actuates clamping jaws causing the die set to be clamped to the moving stock. Continued motion of the upper platen causes the shearing blade to sever a length of the stock emanating from the mill. The cut-off die set is supported during the cutting stroke by a carriage assembly slidably mounted on a set of rails secured to the press bed. This arrangement allows the die set to travel with the stock during the cut and obviates the need to stop the stock each time a cut is made.

The cut-off die must be specifically aligned and secured to the carriage for proper operation during the cutting stroke. Larger tubing sizes require a corresponding increase in the size of the die set. Increasing the size of the die set requires additional time and effort to align and secure the die set to the carriage.

It is important to note that time is of the essence in the tube cutting industry. Tubing continuously emanates from a tubing mill at a high rate of speed, any stoppage of the mill for repairs or replacement of parts results in lost production and revenue for the tube maker. Therefore, any time savings resulting from ease in maintenance or replacement of the die set increases the efficiency of the mill. As in all machine industries, less down time means greater production. The quicker a die set may be removed and replaced the less the mill is down and conversely the greater the production output.

While other mechanical systems have been developed for locating and securing a die set, such as clamps or spring loaded wedges, these devices are not easily adaptable to the moving carriage of a cut-off press. These devices fail to maintain the positive locking force required to keep the die set securely positioned during the rapid motion and change in forces occurring during the cutting stroke.

SUMMARY OF THE INVENTION

The present invention is directed toward a cutoff press having a means to position and positively secure a cut-off die set to the carriage of a cut-off press.

According to the first embodiment the lower platen of the cut-off die set has two opposite outwardly beveled edges. One outwardly beveled edge coacts with an inwardly beveled edge of a stop means fixed to the carriage. A rotatable eccentric clamping means is located on the carriage and coacts with the opposite outwardly beveled edge of the lower platen. A rotating means is used to urge the eccentric clamping means into contact with the lower platen so that the lower platen is wedged between the stop means and the eccentric clamping means.

Another aspect of the invention includes a bracket mounted to the carriage and an axial member, having an inwardly beveled eccentric portion, journalled at one end in the carriage and journalled at the opposite end in the bracket. A further aspect of the invention includes an inwardly beveled concentric ring portion slidably engaging the cylindrical portion of said eccentric.

Another aspect of the invention includes a shoulder portion on the axial member engaging the undersurface of the bracket member and a locking nut placed on the threaded upper portion of the axial member to engage the bracket member on the side opposite the shoulder so that the axial member may be locked in a fixed position.

Another aspect of the invention includes a handle attached to the axial member to rotate the eccentric portion of the axial member into contact with the outwardly beveled edge of the lower platen. Further aspects include a power assist or other mechanical means for applying the force necessary to rotate the axial member.

According to a further feature of the invention, a locating means is used to accurately position the cut-off die set on the carriage Further features of the locating means include a retractable centering pin mounted on the lower platen, the centering pin is extended downward from the lower platen to engage a centering bore located on the carriage.

According to a further aspect of the invention, the locator means includes a gib fixed to the rear edge of the carriage.

According to the second embodiment the rotatable clamping eccentric means includes an eccentric member used to urge a wedge member, having an inwardly beveled edge, into contact with the outwardly beveled edge of the lower platen opposite the stop means so that the lower platen is wedged between the stop means and clamp means.

Another aspect of the invention includes an axial member having an eccentric portion is used to urge the wedge member into contact with the lower platen.

A further aspect of the invention includes guide members to position and support the wedge member in the operative position.

Another aspect of the invention includes a locking nut placed on the axial member to lock the axial member in a fixed position.

Another aspect of the invention includes a handle attached to the axial member to rotate the eccentric portion of the axial member. Further aspects include a power assist or other mechanical means to apply the force necessary to rotate the axial member.

According to a further feature of the invention a locating means is used to accurately position the cut-off die set on the carriage. Further features of the locating means include a retractable centering pin mounted on the lower platen, the centering pin is extended downward from the lower platen to engage a centering bore located on the carriage.

DETAILED DESCRIPTION OF THE PREFERRED EMBODIMENT

Figure 1:
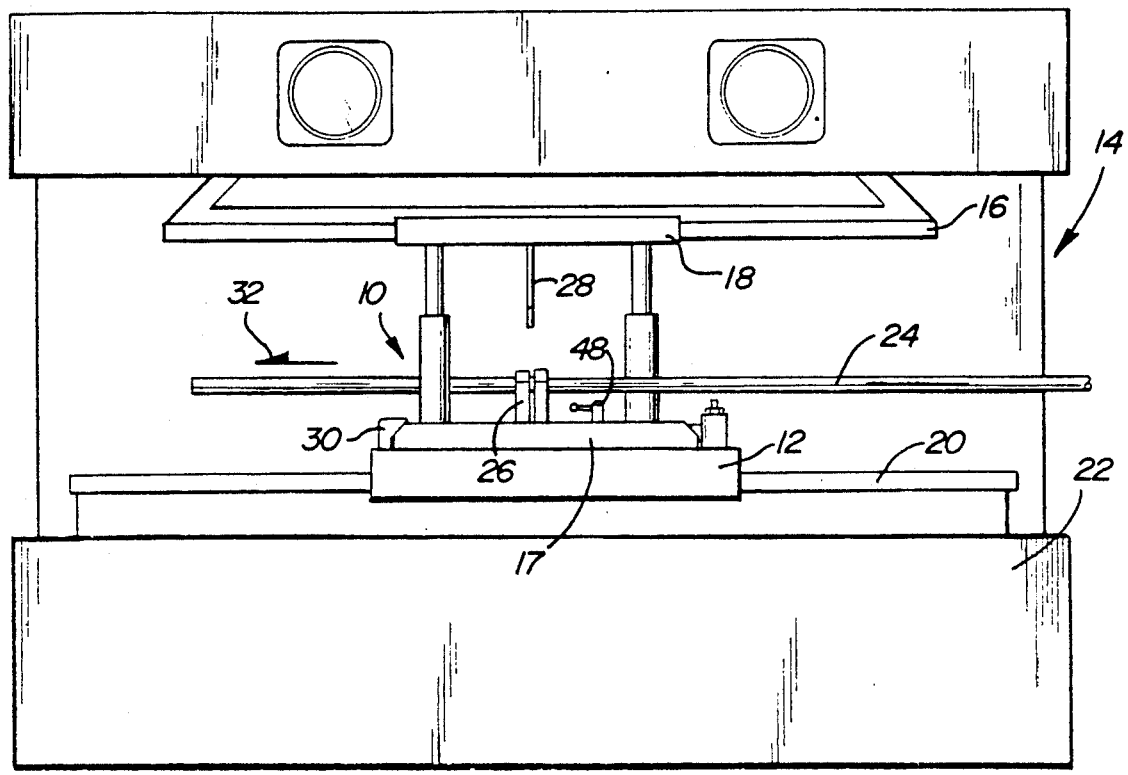
FIG. 1 is a front view of a cut-off die set secured to the carriage of a cut-off press.
Figure 2:
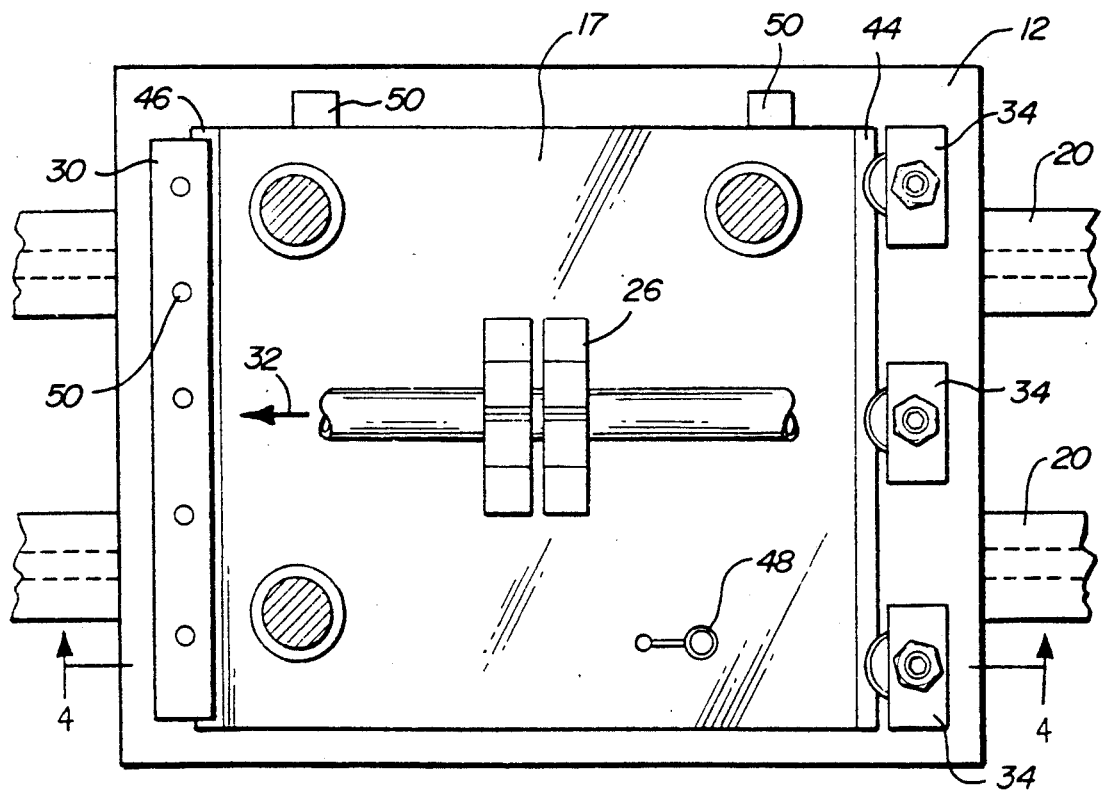
FIG. 2 is a top view of the first embodiment of the invention wherein the lower platen of a cut-off die set is mounted to the carriage of a cut-off press.

Referring to FIGS. 1 and 2, the illustrated cutoff die set 10 is mounted to a carriage 12 of a cut-off press 14 according to the first embodiment. The cut-off press 14 includes a ram 16 connected to an upper platen or shoe 18 of the cut-off die set 10. The carriage 12 is slidably mounted to a set of parallel, spaced rails 20 located in a press bed 22.

In cut-off systems of the general type with which the present invention is concerned, the cut-off die set 10 is positioned in this case at the right side of press 14 to receive the tubing 24 as it emanates from the fabrication mill. Prior to the cutting stroke, the die set 10 is accelerated to the speed of the work, i.e., the tubing 24, by means of an accelerator (not shown) coupled to the carriage 12. Accelerators are well known in the art, see U.S. Pat. No. 3,460,421.

Once the die set 10 has synchronized speed with the tubing 24 the downward stroke of the ram 16 operates the clamping mechanism 26 and clamps the die set 10 to the moving tubing. As the ram 16 continues its downward stroke the upper platen 18 of the die set 10 continues to descend causing a shearing blade 28 to sever a length from the moving tube 24. Following the severing cut the ram mechanism 16, operating in a reverse manner, retracts the shearing blade 28 and releases the clamping mechanism 26 after which the die set 10 is returned to the starting position by the carriage 12 and accelerator combination in preparation for a new cutting cycle.

FIG. 2 illustrates the first embodiment of the invention wherein the lower platen 17 of the die set fixedly secured to the carriage 12. The carriage 12 is slidably mounted to the rails 20 located in the press bed 22 of the cut-off press 44. As shown, a fixed gib 30 is mounted to one end of the carriage 12 perpendicular to the direction of the tube travel 32. The fixed gib 30 has an inwardly beveled surface 30a (see FIG. 4) which is complementary to and coacts with the outwardly beveled surface 46 of the lower platen 17. The gib 30 is mounted to the carriage 12 by means of threaded fasteners 50, obviously other fastening means can be used. Opposite fixed gib 30 are eccentric clamps 34 which coact with the opposite outwardly beveled surface 44 of the lower platen 17. FIG. 2 shows three eccentric clamps; however, this is for illustration purposes only. The number of clamps may vary depending upon different factors such as, die set size, tubing size, clamp size, and tubing and cutting speed.

Figure 3:
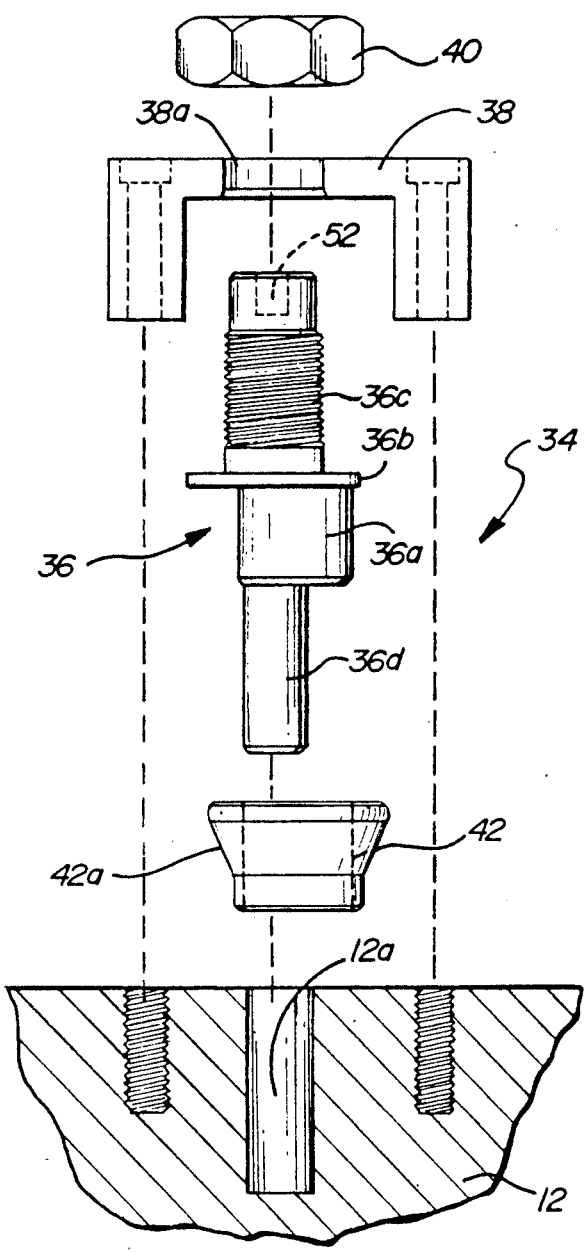
FIG. 3 is an exploded view of the eccentric locking member according to the first embodiment.

FIG. 3 is an exploded view of the eccentric clamp mechanism 34. The clamp mechanism includes an axial member 36 having an eccentric portion 36a, a shoulder portion 36b, a threaded portion 36c, and a shaft portion 36d. The shaft portion 36d of the axial member 36 is journalled in a blind journal 12a located on the carriage 12. A bracket 38 having a bore 38a is mounted to the carriage 12. The threaded portion 36c of the axial member 36 is journalled in the bore 38a of the bracket 38. The bracket 38 serves as a positive support for the upper portion of the axial member 36.

A clamp ring 42 having an outwardly beveled edge 42a is placed over the eccentric portion 36a of the axial member 36. The clamp ring 42 rotates about the eccentric portion 36a of the axial member 36. The eccentric portion 36a of the axial member 36 may be formed integrally with a beveled edge, thus eliminating the need for the clamp ring 42. However, the clamp ring 42 by freely rotating about the eccentric portion 36a distributes the wear, caused by repeated use of the clamp mechanism 34, over the entire clamp ring 42. When the clamp ring 42 becomes worn it may be removed and replaced without having to replace the axial member 36.

When used in combination, the bracket 58, the lock nut 40 and the shoulder portion 36b of the axial member 36 form a locking means to lock the axial member 36 in a clamped position.

Figure 4:
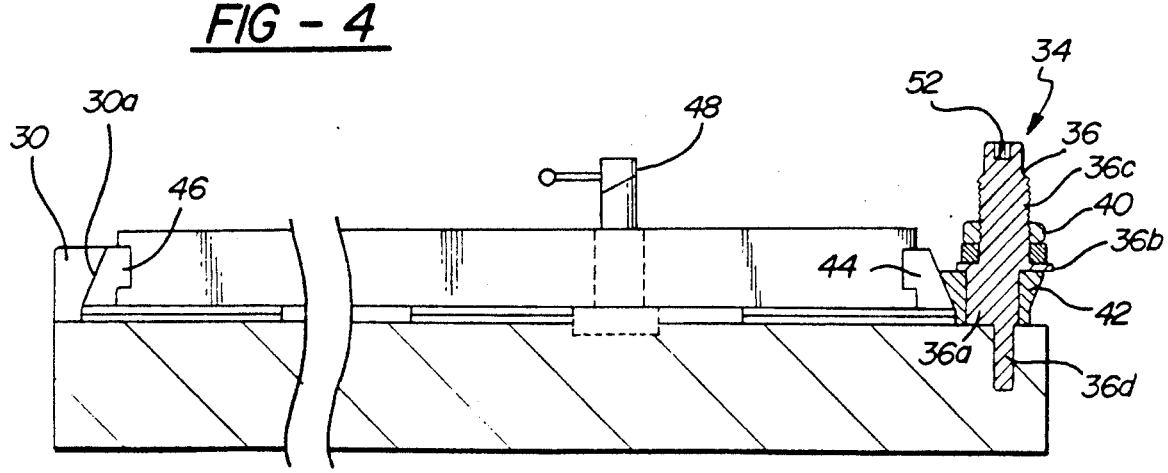
FIG. 4 is a side view of the carriage and lower platen along section 4—4.

FIG. 4 shows the lower platen 17 of the cut-off die set 10 secured between the fixed gib 30 and the eccentric clamp 34. The axial member 36 has been rotated to enable the eccentric portion 36a and clamp ring 42 combination to engage the outwardly beveled portion 44 of the lower platen 17. The action of the eccentric portion 36a and clamp ring 42 on the outwardly beveled portion 44 of the lower platen 17 causes the opposite outwardly beveled edge 46 to engage the inwardly beveled edge 30a located on the fixed gib 30 thereby positively securing the cut-off die set 10 to the carriage 12. The nut 40 is then placed on the threaded portion 36c of the axial member 36 in a clockwise direction. When the nut 40 is tightened it prevents the axial member 36 from rotating counter-clockwise; i.e., the direction necessary to release the clamping mechanism 34 from the lower platen 17.

In the first embodiment the die set 10 is placed on the carriage and aligned using either a locator pin 48 or stops 52 (see FIG. 2). Once the die set has been properly located, the operator using a suitable rotational means; i.e., by hand or some other power assisted means such as hydraulic or pneumatic cylinders, rotates the eccentric clamps 34 in a clockwise manner causing the clamp ring 42 to contact the outwardly beveled surface 44 of the lower platen 17 which creates a clamping force that wedges the lower platen 17 between the fixed gib 30 and eccentric clamps 34. The axial member 36 of the first embodiment is rotated by using a allen wrench placed in a socket 52 located on the top surface of the axial member 36. Once the eccentric clamp member 36 is tightened the locking nut 40 is placed on the threaded portion 36c of the axial member 36 and tightened until it engages the upper surface of the bracket 38 tightening the nut 40 causes the shoulder portion 36b of the axial member 36 to engage the lower surface of the bracket 38 thus securing the axial member 36 in a locked position.

In order to release the die set 10 the operator need only loosen the locking nut 40 and rotate the axial member 36 in a counterclockwise manner. Rotating the axial member 36 disengages the clamp ring 42 from the lower platen 17 and releases the clamping force. Once the clamping force is removed the cut-off die set 10 may be removed from the carriage assembly 12.

Figure 5:
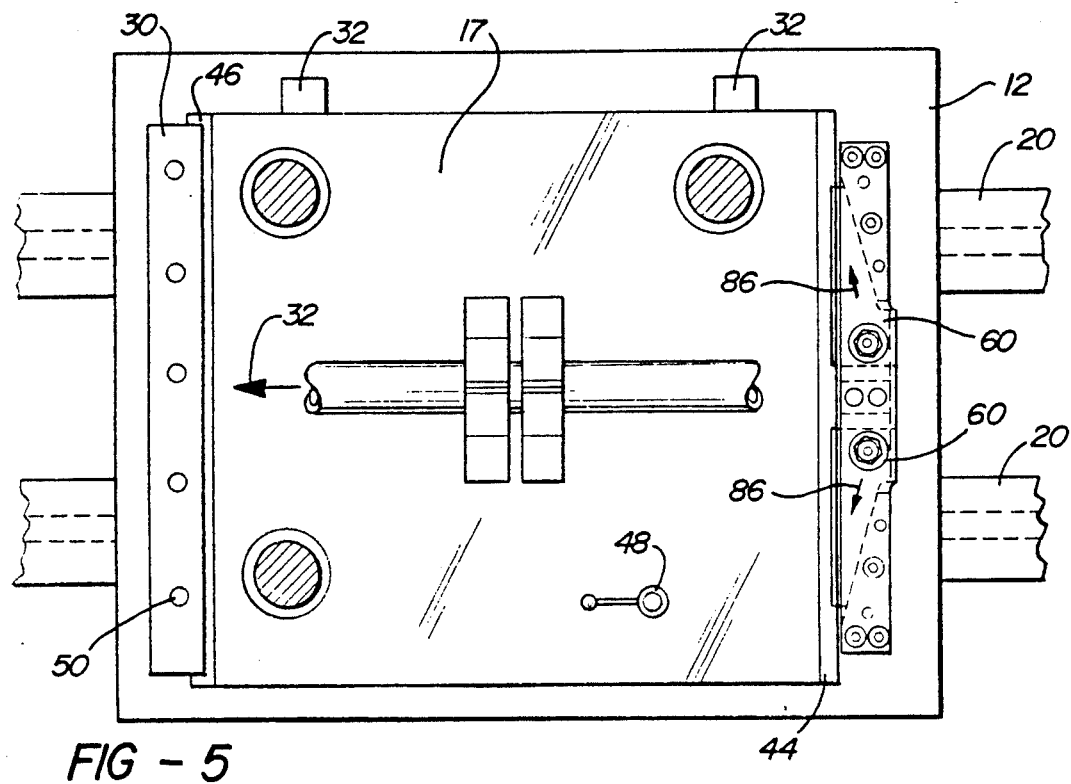
FIG. 5 is a top view of the second embodiment of the invention wherein the lower platen of a cut-off die set is mounted to the carriage of a cut-off press.

FIGS. 5-8 illustrate the second embodiment of the clamping apparatus. Referring to FIG. 5, FIG. 5 illustrates the second embodiment of the invention wherein the lower platen 17 of the die set is fixedly secured to the carriage 12. The carriage 12 is slidably mounted to the rails 20 located in the press bed 22 of the cut-off press 14. As shown, fixed gib 30 is mounted to one end of the carriage 12 perpendicular to the direction of the tube travel 32. The fixed gib 30 has an inwardly beveled surface 30a (see FIG. 4) which is complementary to and coacts with the outwardly beveled surface 46 of the lower platen 17. The gib 30 is mounted to the carriage 12 by means of threaded fasteners 50, other fastening means can be used. Opposite fixed gib 30 in the second embodiment are wedge clamps 60 which coact with the opposite outwardly beveled surface 44 of the lower platen 17. FIG. 5 shows two wedge clamps; however, this is for illustration purposes only. The number of clamps may vary depending upon different factors such as die set size, tubing size, clamp size and tubing and cutting speed. Further, the wedge clamps 60 are shown as operating in opposite directions 86, again this is for illustration purposes only as the wedge clamps can be arranged so as to apply clamping force in the same direction.

Figure 6:
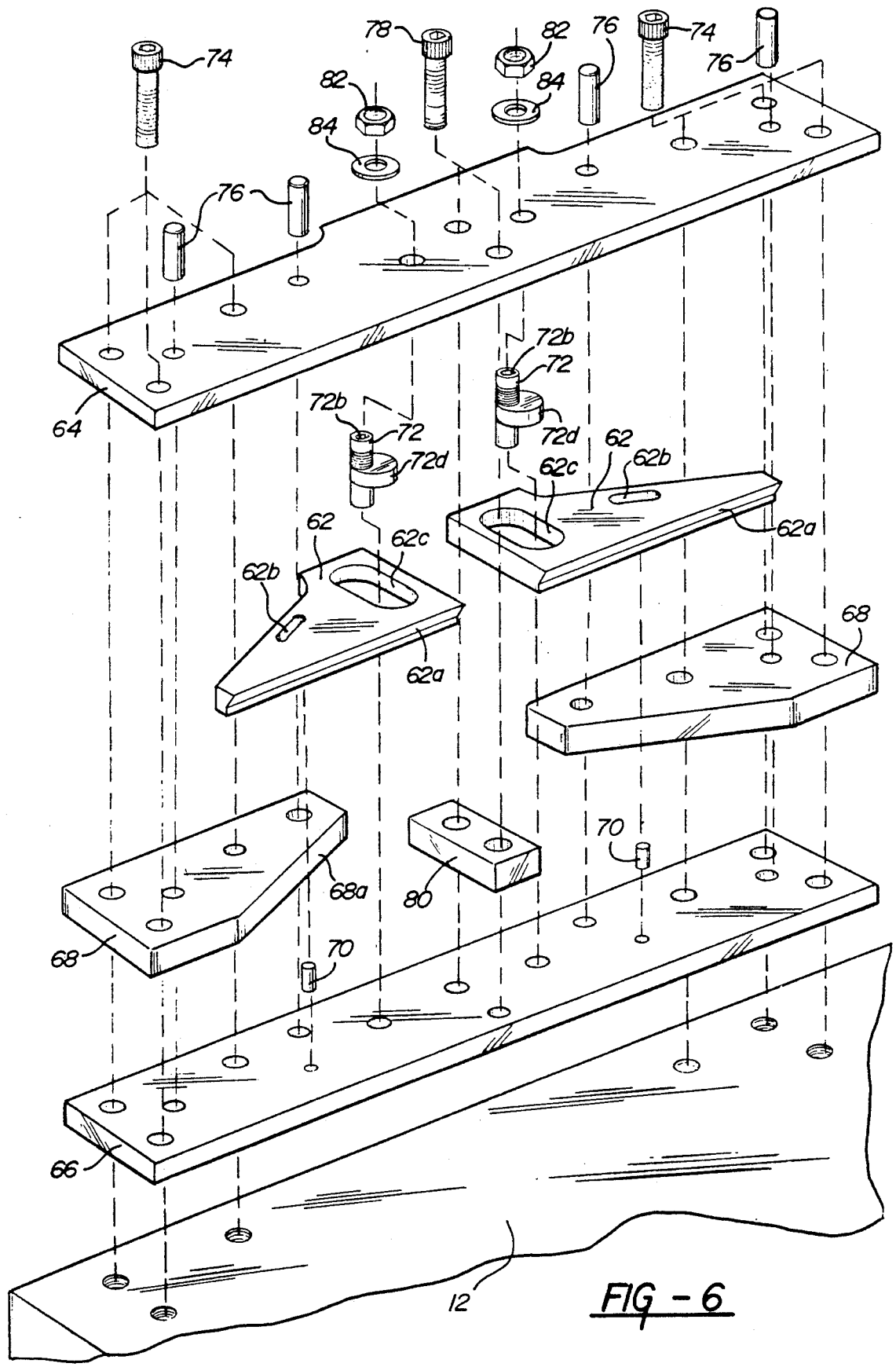
FIG. 6 is an exploded perspective view of the clamping apparatus according to the second embodiment.

Referring to FIG. 6, FIG. 6 is an exploded perspective view of the wedge clamps 60. While two wedge clamps 60 are shown they are identical and thus may be used singularly or in combination. Each wedge clamp includes a wedge member 62 having an inwardly beveled portion 62a. The wedge member 62 is slidably mounted between an upper mounting plate 64 and a lower mounting plate 66. A guide member 68 is used to both support and guide the wedge member 62. A pin 70 is journalled in lower plate 66 and engages o the wedge member 62 in a slotted opening 62b. The pin 70 further guides and supports the wedge member 62. The wedge member 62 is urged into the clamping position by an axial member 72 having an eccentric portion 72a. The eccentric portion 72a engages the wedge member 62 in a slot 62c. When the eccentric portion 72a of the axial member 72 is rotated within the slot 62c, the wedge member is forced outward along an inclined face 68a of the guide member 68 causing the wedge member 62 to engage outwardly beveled edge 44 of the lower platen 17.

The upper and lower mounting plates 64,66 sandwich the wedge member 62 and guide member 68 and further form the support means for the axial member 72. The entire assembly is secured to the carriage 12 by means of threaded fasteners 74. Additionally pins 76, threaded fasteners 78 and spacer block 80 are used to secure and provide support for the wedge clamp 60 assembly. Lock nut 82 and washer 84 are used to lock the axial member 72 and wedge member 62 in a clamped position.

Figure 7:
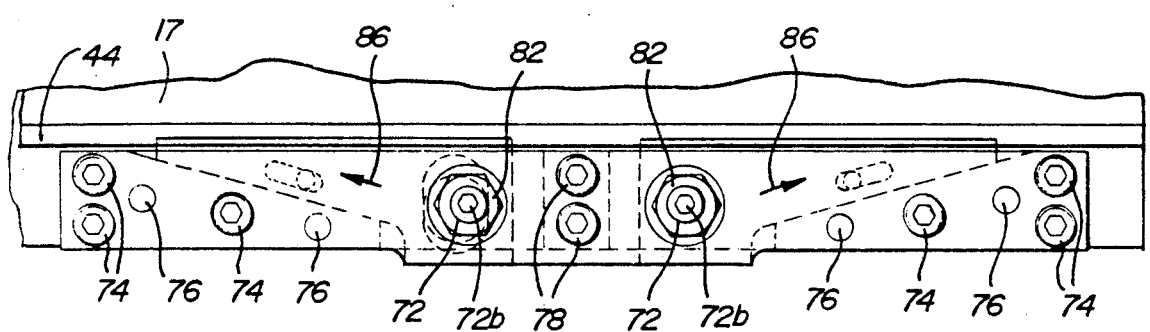
FIG. 7 is a top view of the clamping apparatus according to the second embodiment.
Figure 8:
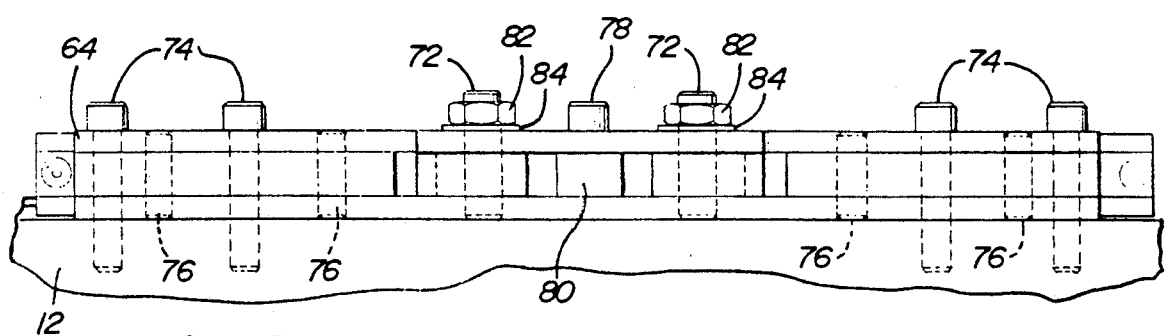
FIG. 8 is a front view of the clamping apparatus according to second embodiment.

Referring to FIG. 7 and 8, FIGS. 7 and 8 show the wedge clamp 60 assembled and fastened to the carriage 12. FIG. 7 shows the direction 86 of the wedge member 62 travel. As shown, the wedges are mounted in such a way as to travel in opposite directions. If desired, the wedges 62 could be mounted in the same direction so as to generate a clamping force in the same direction.

Utilizing the second embodiment the die set 10 placed on the carriage and aligned using either a locator pin 48 or stops 52. See FIG. 5. Once the die set has been properly located, the operator using a suitable rotational means; i.e., by hand using an Allen wrench in a socket 72b located on the top surface of the axial member 72, or a power assisted means such as hydraulic or pneumatic cylinders, rotates the eccentric portion 72a of the axial member 72 to urge the wedge member 62 into contact with the outwardly beveled surface 44 of the lower platen 17 so that the lower platen 17 is wedged between the fixed gib 30 and the wedge clamp 60. Once the axial member is rotated and the wedge clamp 60 is operative, the locking nut 82 is placed on the axial member and tightened until in engages the upper surface of the upper mounting plate 64, tightening the nut 82 prevents the axial member 72 from rotating in the direction required to release the wedge clamp 60.

In order to release the die set 10, the operator need only loosen the locking nut 82 and rotate the axial member 72 to disengage the wedge member 62 from the lower platen 17 and release the clamping force. Once the clamping force is released, the cut-off die set 10 may then be removed form the carriage assembly 12.

Although several embodiments of the invention has been illustrated and described in detail, it will be apparent that various changes may be made in the disclosed embodiment without departing from the scope or spirit of the invention.

We claim:

1. An apparatus for positioning and securing die components to the carriage of a cut-off press comprising:
   a platen having two outwardly beveled opposite edges;
   die components secured to said platen;
   stop means fixed to said carriage having an inwardly beveled edge to coact with one of the outwardly beveled edges of the platen;
   a bracket member fixedly mounted to said carriage opposite said stop means;
   an axial member having an eccentric portion journalled in said bracket;
   a guide member mounted to said bracket member opposite said stop means; and
   a wedge member, having an inwardly beveled edge, driven by the eccentric portion of said axial member between the guide member and the outwardly beveled edge of the platen opposite the stop means to clamp the platen to the carriage.

2. An apparatus according to claim 1 wherein the guide member is secured to said bracket member to support the wedge member.

3. An apparatus according to claim 2 wherein a nut is placed on the axial member to engage the bracket member and hold the axial member in a fixed position.

4. An apparatus according to claim 1 including a locator means for accurately positioning the platen on the carriage.

5. An apparatus according to claim 4 wherein said locator means comprises a gib fixed to the rear edge of the carriage.

6. An apparatus according to claim 4 wherein said locator means comprises said carriage having a centering hole located therein; and a retractable centering pin mounted on said platen, said centering pin being extended from the platen to engage the centering hole located on said carriage.

7. A clamping apparatus for securing die components to the carriage of a cut-off press comprising:

a platen having two outwardly beveled opposite edges;

die components secured to the platen;

stop means fixed to said carriage having an inwardly beveled edge to coact with one of the outwardly beveled edges of the platen; and rotatable eccentric clamping means, including a bracket mounted to the carriage and an axial member, having an inwardly beveled eccentric portion, journaled at one end in the carriage and journaled at the opposite end in the bracket, located on the carriage to coact with the outwardly beveled edge opposite the stop means to wedge said platen between the stop means and the eccentric clamping means.

8. A clamping apparatus according to claim 7 wherein said inwardly beveled eccentric portion includes an inwardly beveled concentric ring portion slidably mounted to an eccentric portion.

9. A clamping apparatus according to claim 8 wherein the eccentric portion includes, a clamp shoulder to engage the bracket when the eccentric portion is urged into contact with the outwardly beveled edge of said platen; and a nut placed on the axial member to engage the bracket on the side opposite said clamp shoulder to hold said axial member in a fixed position.

10. A clamping apparatus according to claim 7 wherein a handle is removably attached to and extending outward from said axial member.

11. A clamping apparatus for securing die components to the carriage of a cut-off press comprising:

platen having two outwardly beveled opposite edges;

die components secured to the platen;

stop means fixed to the carriage having an inwardly beveled edge to coact with one of the outwardly beveled edges of the platen;

a bracket mounted to the carriage;

an axial member, having an inwardly beveled eccentric portion to coact with the outwardly beveled edge opposite the stop means, journaled at one end in the carriage and journaled at the opposite end in the bracket;

whereby rotation of said axial member urges the inwardly beveled eccentric portion of the axial member into contact with the platen to wedge said platen between the stop means and the axial member.

12. A clamping apparatus according to claim 11 wherein said inwardly beveled eccentric portion includes an inwardly beveled concentric ring portion slidably mounted to the eccentric portion.

13. A clamping apparatus for securing die components to the carriage of a cut-off press comprising:

a platen having two outwardly beveled opposite edges;

die components secured to the platen;

locator means for accurately positioning the platen on the carriage;

stop means fixed to said carriage having an inwardly beveled edge to coact with one of the outwardly beveled edges of the platen; and rotatable eccentric clamping means, including a bracket mounted to the carriage and an axial member, having an inwardly beveled eccentric portion, journaled at one end in the carriage and journaled at the opposite end in the bracket, located on the carriage to coact with the outwardly beveled edge opposite the stop means to wedge said platen between the stop means and the eccentric clamping means.

14. A clamping apparatus according to claim 13 wherein said locator means comprises a gib fixed to the rear edge of the carriage.

15. A clamping apparatus according to claim 13 wherein said locator means comprises said carriage having a centering hole located therein; and a retractable centering pin mounted on said platen, said centering pin being extended from the platen to engage the centering hole located on said carriage.

* * * * *